(12) United States Patent
Mane et al.

(10) Patent No.: US 12,550,017 B2
(45) Date of Patent: Feb. 10, 2026

(54) QoS IMPACT MITIGATION DURING UNAVAILABILITY OF RAN SUPPORT OF NETWORK SLICING

(71) Applicant: Apple Inc., Cupertino, CA (US)

(72) Inventors: Harshal R Mane, San Jose, CA (US); Alosious Pradeep Prabhakar, Singapore (SG); Princewill E Ihuoma, San Diego, CA (US); Sofheem Mohammed, Santa Clara, CA (US); Pranav Tripathi, San Jose, CA (US); Muthukumaran Dhanapal, San Diego, CA (US); FNU Srinivas Kote Narasimhamurthy, San Diego, CA (US)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 18/477,874

(22) Filed: Sep. 29, 2023

(65) Prior Publication Data

US 2025/0113268 A1    Apr. 3, 2025

(51) Int. Cl.
*H04W 36/00* (2009.01)
*H04W 76/20* (2018.01)

(52) U.S. Cl.
CPC ... *H04W 36/008357* (2023.05); *H04W 76/20* (2018.02)

(58) Field of Classification Search
CPC ......... H04W 36/008357; H04W 36/13; H04W 76/20
See application file for complete search history.

(56) References Cited

U.S. PATENT DOCUMENTS

| | | | |
|---|---|---|---|
| 11,323,935 B2 | 5/2022 | Soma | |
| 2020/0359440 A1* | 11/2020 | Qiao | ..................... H04W 76/11 |
| 2022/0167355 A1 | 5/2022 | Andrews | |
| 2023/0092595 A1 | 3/2023 | Wong | |

* cited by examiner

*Primary Examiner* — Jamal Javaid
(74) *Attorney, Agent, or Firm* — Kowert, Hood, Munyon, Rankin & Goetzel, P.C.

(57) ABSTRACT

Apparatuses, systems, and methods for QoS impact mitigation during unavailability of RAN support of network slicing, e.g., in 5G NR systems and beyond. A UE may determine, while connected to a first cell of a network, whether handover instructions include DRB setup instructions on a second cell of the network for a PDU session established towards a first network slice on the first cell. The UE may, upon expiration of a timer initiated in response to the determination and/or confirmation that the second cell does not support network slicing, route, upon determining that there is not a neighboring cell that supports the first network slice and/or that there is not a routing rule for the first network slice that allows routing of traffic to another established DRB, user plane traffic to an eMBB DRB.

20 Claims, 9 Drawing Sheets

QoS IMPACT MITIGATION DURING UNAVAILABILITY OF RAN SUPPORT OF NETWORK SLICING

FIELD

The invention relates to wireless communications, and more particularly to apparatuses, systems, and methods to mitigate Quality of Service (QOS) impact during unavailability of radio access network (RAN) support of network slicing, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for QoS impact mitigation during unavailability of RAN support of network slicing, e.g., in 5G NR systems and beyond. For example, when a user equipment device (UE) moves from a network slicing to a non-network-slicing location (e.g., as denoted by a lack of data radio bearer (DRB) for a network slice protocol data unit (PDU)), the UE may, after network slice PDU establishment fails and the UE exhausts network slice PDU establishment retries and no DRB is added, back off from requesting the network slice PDU for a first period of time if the UE is not in a mobility condition. Further, when the UE has not moved, the UE may, upon the first period of time lapsing, trigger a timer of a second period of time to extend the back off from requesting the network slice PDU. Additionally, the UE may continue to reset the time upon expiry at least until the UE detects a mobility condition away from a current cell (e.g., the UE detects a primary cell identifier (PCI) change). In addition, after detection of the mobility condition, the UE may re-attempt network slice PDU establishment. Note that if the re-attempt fails, the UE may again enter into a back off sequence as described above. As another example, a UE may monitor user experience metrics of applications associated with a network slice, e.g., such as latency, RTP packet loss, jitter buffer, transmission rates, reception rates, and so forth. Then, if one or more of the user experience metrics falls below an associated threshold after a handover (e.g., from a network slicing location to a non-network slicing location), the UE may assume network slicing is not supported. Further, based on the assumption, the UE may inform core network and establish a default radio bearer. Additionally, once the UE moves to the default radio bearer, the UE may attempt to network slice PDU establishment, e.g., using a back off sequence as described above. Such a scheme may allow the UE to move to a network slice while avoiding degradation of user experience since data is already being transmitted over the default radio bearer.

As an example, in some embodiments, a UE may be configured to determine, while connected to a first cell of a network, whether handover instructions include DRB setup instructions on a second cell of the network for a PDU session established towards a first network slice on the first cell. The UE may be configured to initiate, in response to determining that the handover instructions do not include DRB setup instructions for the PDU session, a timer. In some instances, a duration of the timer is based, at least in part, on a type of the first network slice. For example, a duration of the timer is shorter for guaranteed bitrate (GBR) network slices as compared to non-GBR network slices. Additionally, the UE may be configured to, upon expiration of the timer and/or confirmation that the second cell does not support network slicing, determine whether a neighboring cell supports the first network slice. Further, the UE may configured to route, upon determining that there is not a neighboring cell that supports the first network slice and/or that there is not a routing rule (e.g., another user equipment (UE) Route Selection Policy (USRP) rule) for the first network slice that allows routing of traffic to another established DRB, user plane traffic to an enhanced mobile broadband (eMBB) DRB.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
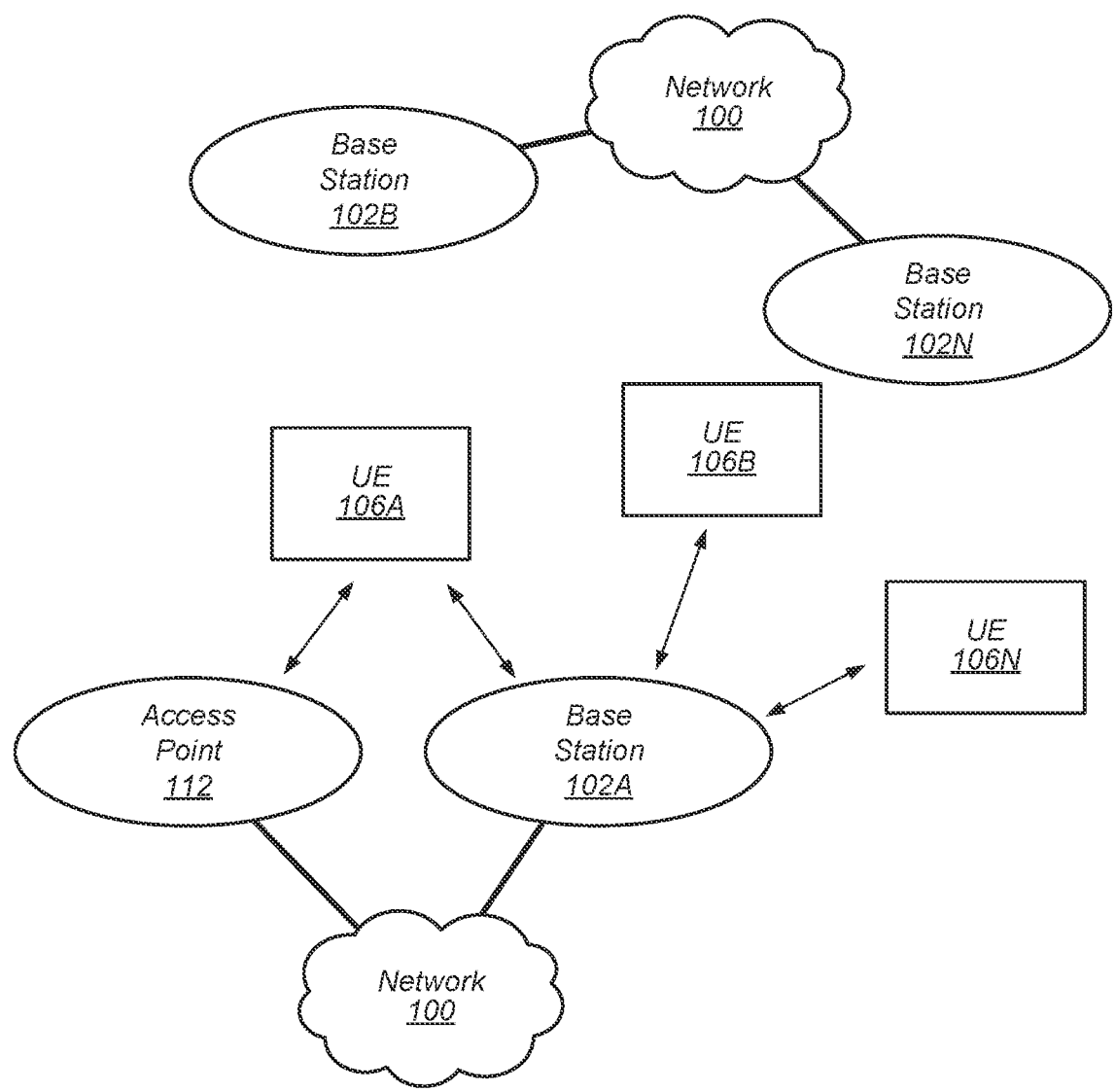
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block.
PDCCH: Physical Downlink Control Channel.
PDSCH: Physical Downlink Shared Channel
RRC: Radio Resource Control

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHZ to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

FIG. 1: Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as LTE, LTE-Advanced (LTE-A), 5G new radio (5G NR), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

In addition, the UE 106 may be in communication with an access point 112, e.g., using a wireless networking (e.g., Wi-Fi) and/or peer-to-peer wireless communication protocol (e.g., Bluetooth, Wi-Fi peer-to-peer, etc.). The access point 112 may provide a connection to the network 100.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., LTE, LTE-A, 5G NR, and beyond). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
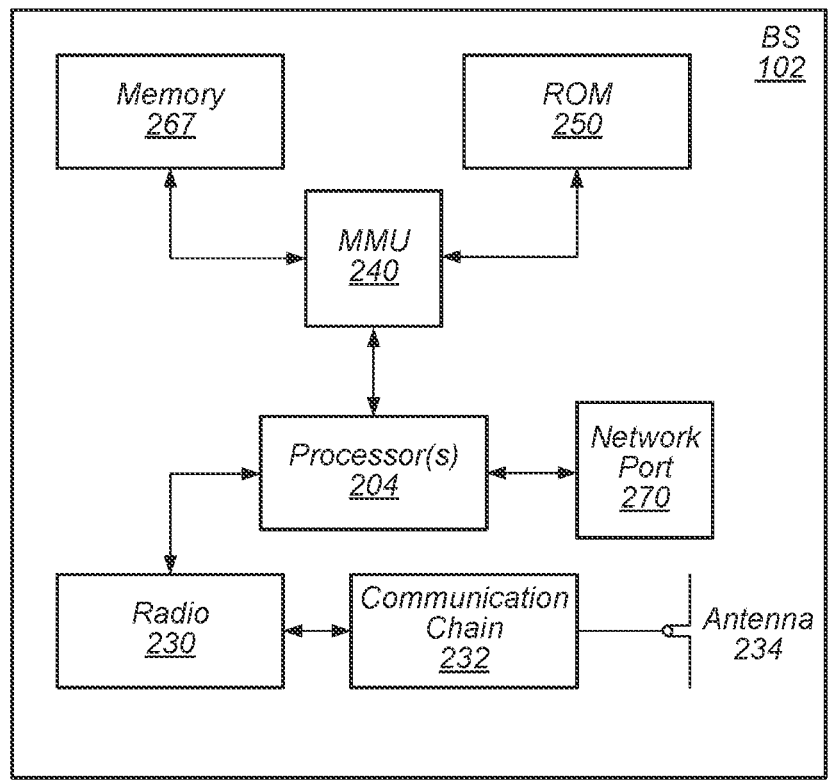
FIG. 2 illustrates an example block diagram of a base station, according to some embodiments.

FIG. 2: Block Diagram of a Base Station

Figure 3:
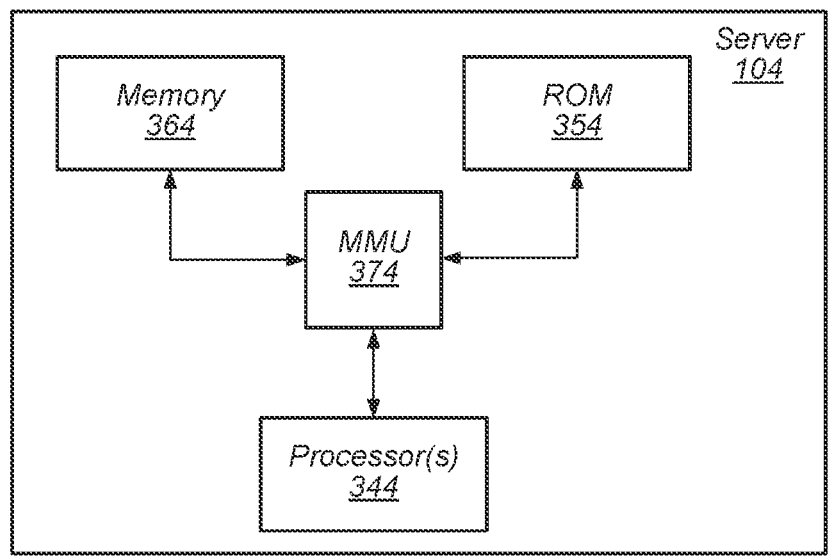
FIG. 3 illustrates an example block diagram of a server, according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR. LTE, LTE-A, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
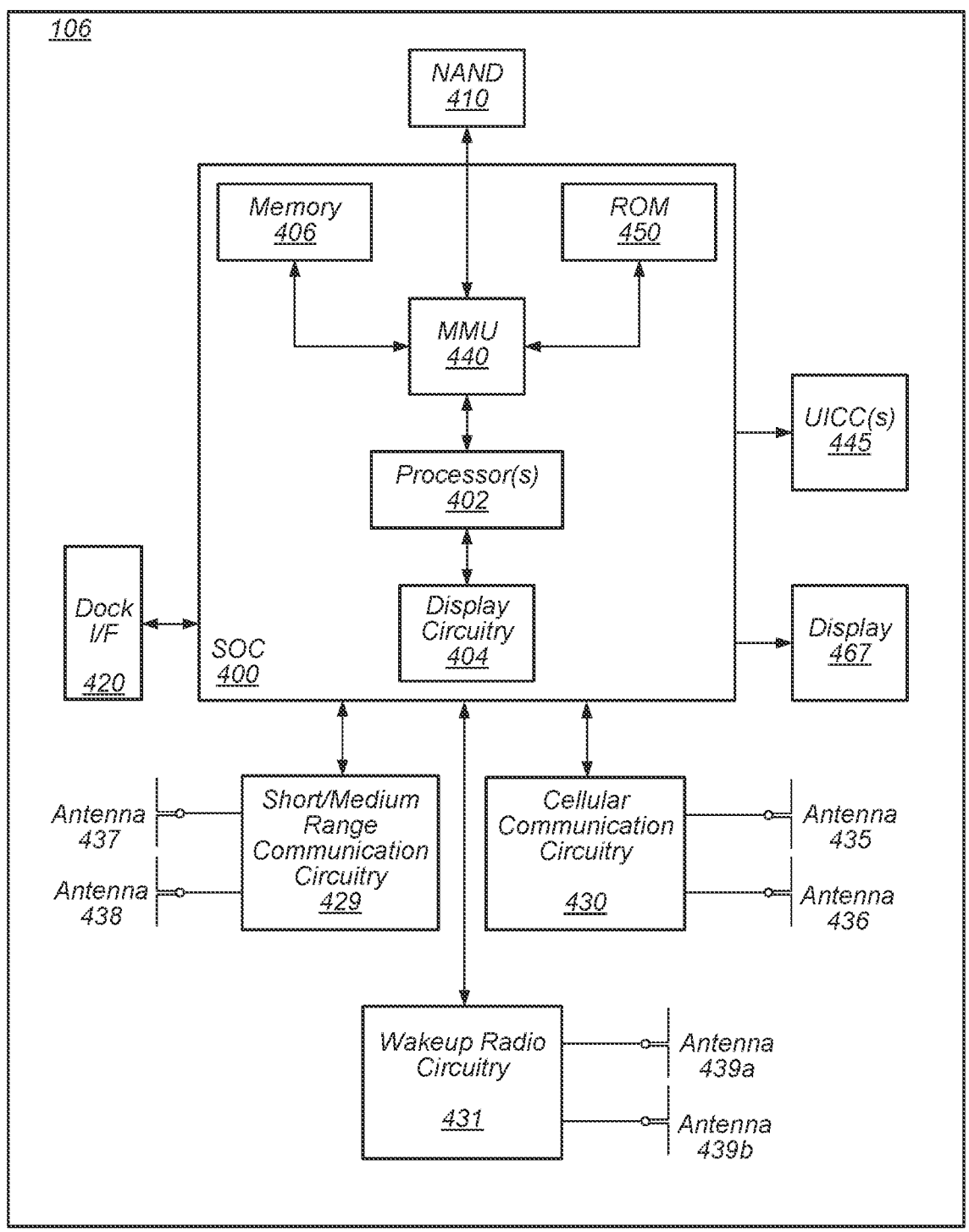
FIG. 4 illustrates an example block diagram of a UE, according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, LTE-A, etc., short to medium range wireless communication circuitry 429 (e.g., Bluetooth™ and WLAN circuitry), and wakeup radio circuitry 431. In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The wakeup radio circuitry 431 may also couple (e.g., communicatively; directly or indirectly) to one or more antennas, such as antennas 439*a* and 439*b* as shown. Alternatively, the wakeup radio circuitry 431 may couple (e.g., communicatively; directly or indirectly) to the antennas 435 and 436 in addition to, or instead of, coupling (e.g., communicatively; directly or indirectly) to the antennas 439*a* and 439*b*. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration. The wakeup radio circuitry 431 may include a wakeup receiver, e.g., wakeup radio circuitry 431 may be a wakeup receiver. In some instances, wakeup radio circuitry 431 may be a low power and/or ultra-low power wakeup receiver. In some instances, wakeup radio circuitry may only be powered/active when cellular communication circuitry 430 and/or the short to medium range wireless communication circuitry 429 are in a sleep/no power/inactive state. In some instances, wakeup radio circuitry 431 may monitor (e.g., periodically) a specific frequency/channel for a wakeup signal. Receipt of the wakeup signal may trigger the wakeup radio circuitry 431 to notify (e.g., directly and/or indirectly) cellular communication circuitry 430 to enter a powered/active state.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMS 410 may be one or more embedded cards (such as embedded UICCs (eUICCs), which are sometimes referred to as "eSIMs" or "eSIM cards").

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for methods for QoS impact mitigation during unavailability of RAN support of network slicing, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
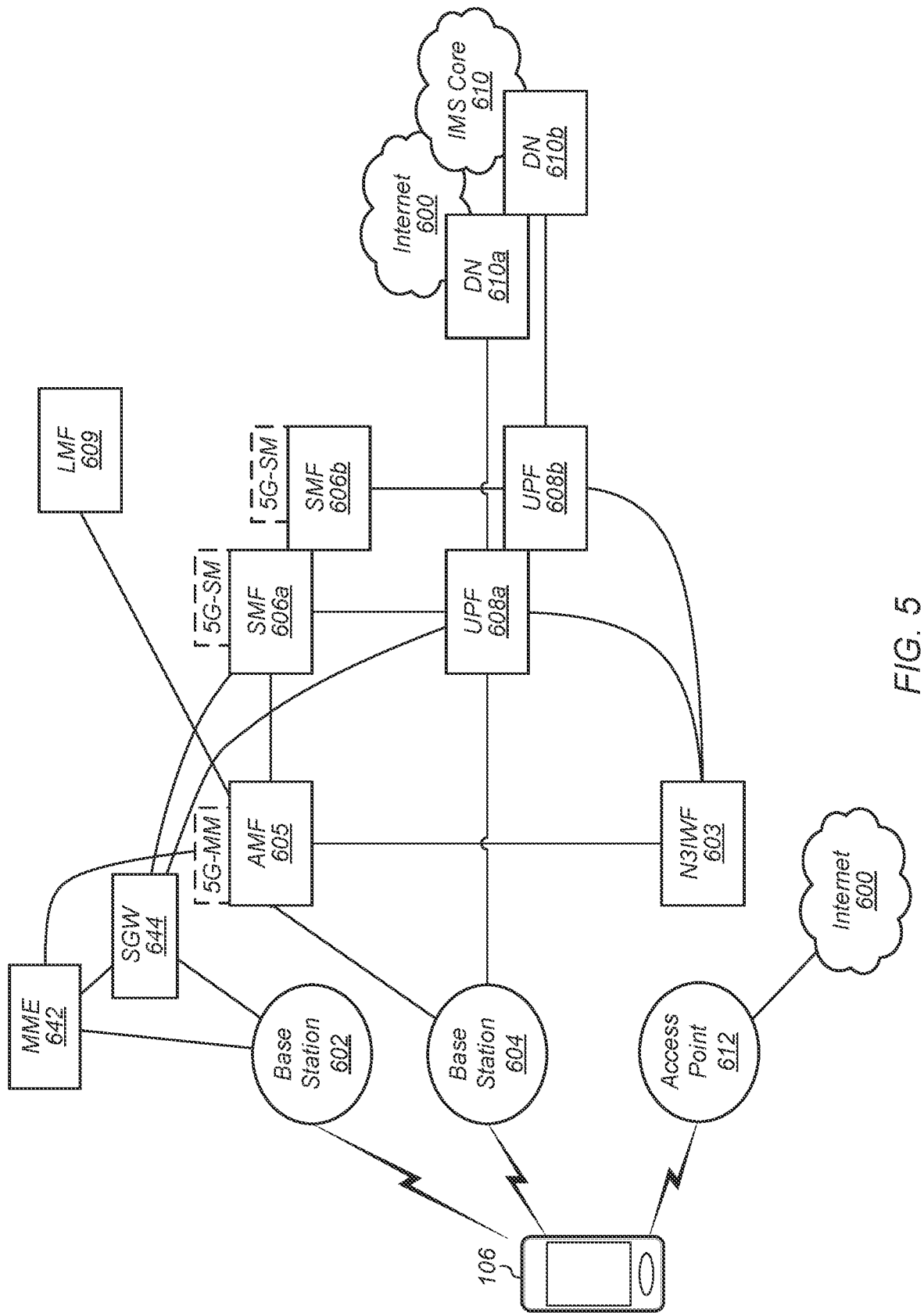
FIG. 5 illustrates an example of a 5G network architecture that incorporates both dual 3GPP (e.g., LTE and 5G NR) access and non-3GPP access to the 5G CN, according to some embodiments.

FIG. 5: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 5 illustrates an example of a 5G network architecture that incorporates both dual 3GPP (e.g., cellular access via LTE and 5G-NR) and non-3GPP (e.g., non-cellular) access to the 5G CN, according to some embodiments. As shown, a user equipment device (e.g., such as UE 106) may access the 5G CN through both a radio access network (RAN, e.g., such as gNB 604 or eNB 602, each of which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may be in communication with a location management function (LMF) 609 via a networking interface, such as an NLs interface. The LMF 609 may receive measurements and assistance information from the RAN (e.g., gNB 604) and the UE (e.g., UE 106) via the AMF 605. The LMF 609 may be a server (e.g., server 104) and/or a functional entity executing on a server. Further, based on the measurements and/or assistance information received from the RAN and the UE, the LMF may determine a location of the UE. In addition, the AMF 605 may include functional entities associated with the 5G CN (e.g., such as a network slice selection function (NSSF), a short message service function 622, an application function (AF), unified data management (UDM), a policy control function (PCF), and/or an authentication server function. Note that these functional entities may also be supported by a session management function (SMF) 606*a* and an SMF 606*b* of the 5G CN. The AMF 605 may be connected to (or in communication with) the SMF 606*a*. Further, the gNB 604 may in communication with (or connected to) a user plane function (UPF) 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and Internet Protocol (IP) Multimedia Subsystem/IP Multimedia Core Network Subsystem (IMS) core network 610.

Note that in various embodiments, one or more of the above-described entities may be configured to perform methods for QoS impact mitigation during unavailability of RAN support of network slicing, e.g., in 5G NR systems and beyond, e.g., as further described herein.

QoS Impact Mitigation During Unavailability of RAN Support of Network Slicing

In current implementations, e.g., as specified by 3GPP Technical Specification 38.300 Release 17.5.0, when a UE performs handover from a base station/cell supporting network slicing to a base station/cell that does not support network slicing, the UE may have a protocol data unit (PDU) session on the core network (e.g., established while on the cell supporting network slicing) but not have a corresponding data radio bearer (DRB) on the cell that does not support network slicing. Such a scenario may lead to data stall on the UE.

Figure 6:
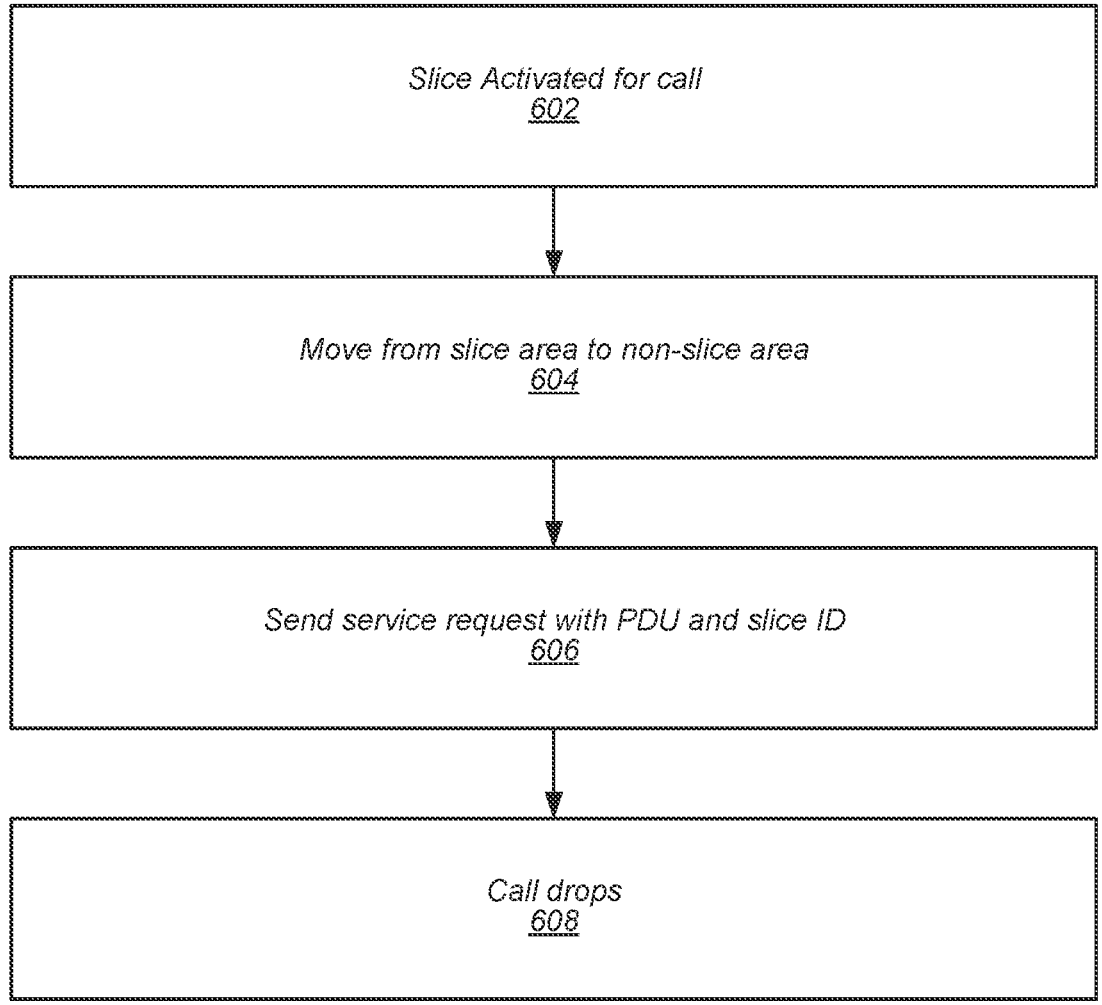
FIGS. 6 and 7 illustrate examples of call flows according to current implementations.

For example as illustrated by FIG. 6, a call flow according to current implementations may proceed as follows. At 602, a UE may have a network slice activated for a particular application supporting a call (e.g., a voice call and/or a video call) in a first cell supporting the network slice. At 604, the UE may move from the first cell supporting the network slice to a second cell that does not support network slicing. At 606, the UE may send a service request PDU with an identifier (ID) of the network slice. At 608, the second cell may not add a DRB for the PDU with the ID of the network slice since the second cell does not support network slicing. As a result, the cell may perform a radio resource control (RRC) release and the call is dropped. Thus, this call flow highlights the issue that when no DRB for the PDU is configured, there is no mechanism to move traffic associated with the call to a default network slice.

Figure 7:
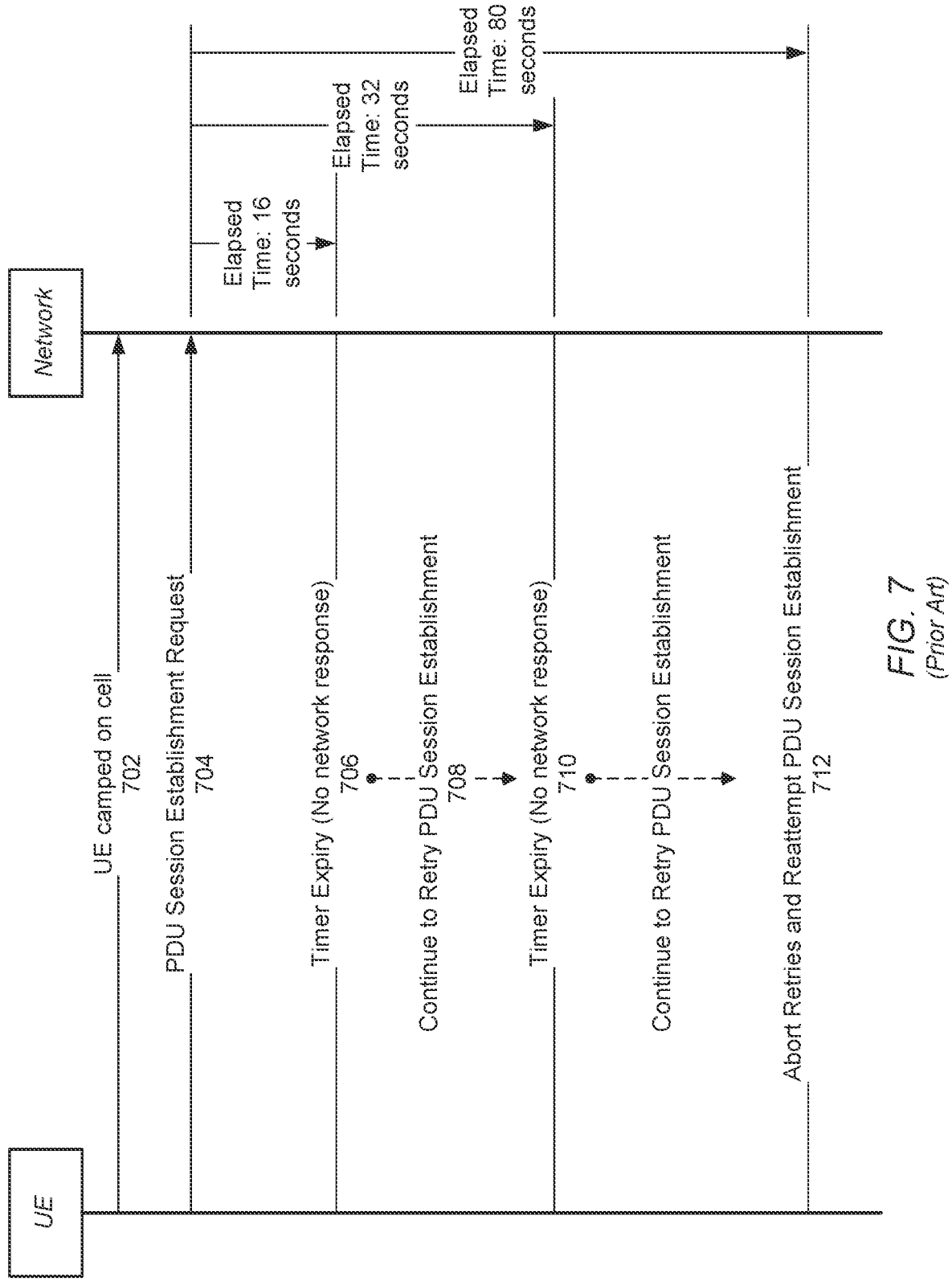

Further, in current implementations, when a UE is in a non-network slicing cell, all network slice supported applications will have data connectivity issues with no recovery mechanisms. Thus, end users may experience data stalls and/or connectivity issues for network slice support applications. For example, FIG. 7 illustrates another call flow according to current implementations. As shown, this call may proceed as follows. At 702, a UE may camp on a cell that does not support network slicing. At 704, the UE may send a PDU session establishment request for a network slice supported application. At 706, since the network does not respond because there is no network slice support in the cell, a first retry timer may expire. At 708, the UE may retry the PDU session establishment. At 710, a second retry timer may expire, increasing a failure count. The UE may continue attempting the PDU session establishment until the failure count meets a threshold (e.g., 5). Note that each retry timer may be 16 seconds and the UE may attempt to establish the PDU session for at least 80 seconds (e.g., 5 retries) prior to aborting the procedure at 712. Thus, this call flow highlights the issues of data connectivity issues due to multiple UE retry attempts and the UE continuing to attempt the network slicing request even after failure.

Therefore, improvements are desired.

Embodiments described herein provide systems, methods, and mechanisms for QoS impact mitigation during unavailability of RAN support of network slicing, including systems, methods, mechanisms to mitigate QoS impact during unavailability of RAN support of network slicing. For example, when a user equipment device (UE) moves from a network slicing to a non-network-slicing location (e.g., as denoted by a lack of data radio bearer (DRB) for a network slice protocol data unit (PDU)), the UE may, after network slice PDU establishment fails and the UE exhausts network slice PDU establishment retries and no DRB is added, back off from requesting the network slice PDU for a first period of time if the UE is not in a mobility condition. Further, when the UE has not moved, the UE may, upon the first period of time lapsing, trigger a timer of a second period of time to extend the back off from requesting the network slice PDU. Additionally, the UE may continue to reset the time upon expiry at least until the UE detects a mobility condition away from a current cell (e.g., the UE detects a primary cell identifier (PCI) change). In addition, after detection of the mobility condition, the UE may re-attempt network slice PDU establishment. Note that if the re-attempt fails, the UE may again enter into a back off sequence as described above. As another example, a UE may monitor user experience metrics of applications associated with a network slice, e.g., such as latency, RTP packet loss, jitter buffer, transmission rates, reception rates, and so forth. Then, if one or more of the user experience metrics falls below an associated threshold after a handover (e.g., from a network slicing location to a non-network slicing location), the UE may assume network slicing is not supported. Further, based on the assumption, the UE may inform core network and establish a default radio bearer. Additionally, once the UE moves to the default radio bearer, the UE may attempt to network slice PDU establishment, e.g., using a back off sequence as described above. Such a scheme may allow the UE to move to a network slice while avoiding degradation of user experience since data is already being transmitted over the default radio bearer.

Figure 8:
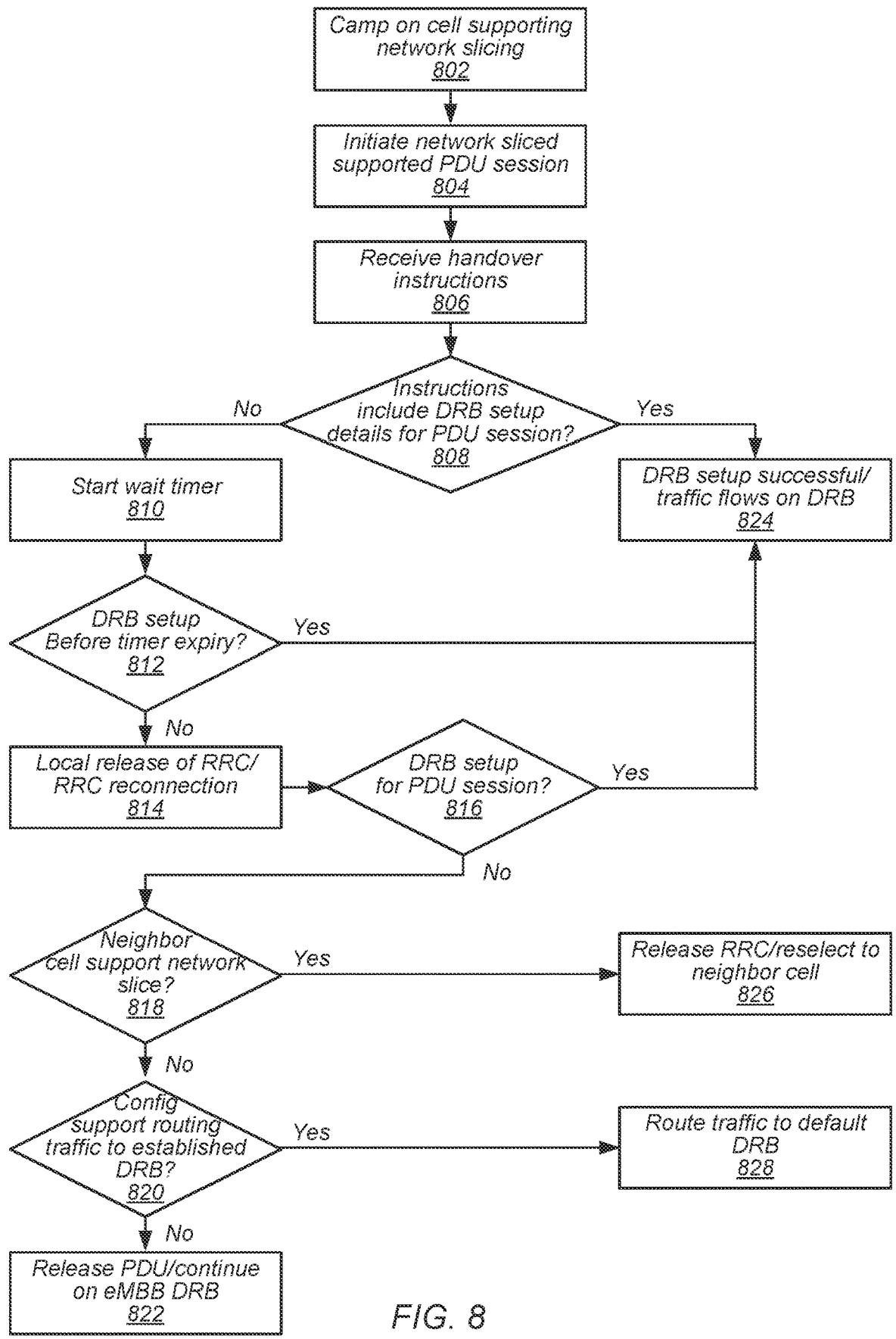
FIG. 8 illustrates a block diagram of an example of a method for network slice switching based on RAN network slicing support, according to some embodiments.

For example, FIG. 8 illustrates a block diagram of an example of a method for network slice switching based on RAN network slicing support, according to some embodiments. The method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a UE, such as UE 106, may camp on a first cell of a network, e.g., a first cell supported by a base station, such as base station 102, that supports network slicing. Thus, the UE may establish a radio resource control (RRC) connection with the first cell. As part of registration on the first cell, the UE may receive an indication that the first cell supports network slicing.

At 804, the UE, based, at least in part, on the first cell's support of network slicing, may initiate a protocol data unit (PDU) session towards a first Single-Network Slice Selection Assistance Information (S-NSSAI), where the first S-NSSAI is part of allowed NSSAIs on the first cell. Note that the S-NSSAI includes at least a slice/service type (SST) field and may include a service differentiator (SD) field. The SST field defines an expected behavior of the network slice in terms of specific features and services, such as vehicle-to-everything (V2X), enhanced mobile broadband (eMBB), ultra-reliable low latency communication (URLLC), massive Internet of Things (MIOT), and/or high-performance machine-type communications (HMTC).

At 806, the UE may receive handover instructions to a second cell, e.g., via an RRC reconfiguration message. The second cell may be supported by another base station, such as another base station 102.

At 808, the UE may determine whether the handover instructions include data radio bearer (DRB) setup details for the PDU session associated with the first S-NSSAI. In other words, the UE may determine whether the RRC reconfiguration message includes DRB setup details for the PDU session associated with the first S-NSSAI. Note that when the handover instructions include DRB setup details for the PDU session associated with the first S-NSSAI, the method may continue at 824. Otherwise (e.g., when the handover instructions do not include DRB setup details for the PDU session associated with the first S-NSSAI), the method may continue at 810.

At 810, the UE may initiate and/or start a time, e.g., a wait timer. A duration of the timer may be based, at least in part, on a slice type of the first S-NSSAI and an expected quality of service (QOS) for the first S-NSSAI. For example, an aggressive timer (e.g., shorter duration timer) may be used when the first S-NSSAI has a guaranteed bit rate (GBR) classification as identified by a mission-critical quality flow indicator (QFI) whereas a conservative timer (e.g., long duration as compared to the aggressive timer) may be used when the first S-NSSAI has a non-GBR as identified by a QFI. For example, non-GBR QOS slice services may include voice over IP (VOIP), video conferencing, and/or buffered streaming and a value of a timer for such services may range between 4 and 6 seconds, at least in some instances. As another example, GBR QOS slice services may include URLLC and/or live streaming and a value of a time for such services may range between 1 and 3 seconds.

At 812, the UE may determine whether the DRB for the PDU session associated with the first S-NSSAI has been established and/or setup, e.g., prior to expiry of the timer. For example, there may have been a temporary radio access network (RAN) issue that caused initial failure of setup of the DRB. Note that when the DRB has been setup, the method may continue at 824. Otherwise (e.g., the DRB has not been setup), the method may continue at 814.

At 814, the UE may perform a local release to tear down (e.g., discontinue) an RRC connection with the second cell, e.g., upon expiry of the timer. In addition, the UE may then attempt a new RRC connection setup with the second cell.

At 816, the UE may again determine whether the DRB for the PDU session associated with the first S-NSSAI has been established and/or setup, e.g., after establishment of the new RRC connection with the second cell. In other words, the UE may confirm, after establishment of the new RRC connection, whether or not the second cell supports network slicing. Note that when the DRB has been setup (e.g., the second cell supports network slicing), the method may continue at 824. Otherwise (e.g., the DRB has not been setup and the second cell does not support network slicing), the method may continue at 818.

At 818, the UE may reference a database, e.g., a finger printing database, to determine whether the UE know of any neighboring cell which may support the first S-NSSAI. The database, at least in some instances, may include a "RAN Slice Availability Table." The database may include, for each entry, primary cell indicator (PCI)/cell identifier (ID), frequency (e.g., NR frequency), tracking area, location (e.g., latitude and longitude), supported network slices, unsupported network slices, and/or neighboring cells/base stations with network slice support. Note that when the UE determines there is a neighboring cell that supports the first S-NSSAI, e.g., based on information retrieved from the database, the method may continue at 826. Otherwise (e.g., the UE determines there is not a neighboring cell that supports the first S-NSSAI, e.g., based on information retrieved from the database), the method may continue at 820.

At 820, the UE may determine whether the first S-NSSAI has other UE Route Selection Policy (USRP) rules that may allow routing traffic to another established DRB, e.g., such as a default configured S-NSSAI. Note that when the UE determines that the first S-NSSAI has other USRP rules that allow routing traffic to another established DRB, the method may continue at 828. Otherwise (e.g., the UE determines that the first S-NSSAI does not have other USRP rules that allow routing traffic to another established DRB), the method may continue at 822.

At 822, the UE may add information associated with the second slice, e.g., such as PCI, band, frequency, location, unsupported network cell (e.g., the first S-NSSAI) to the database and perform PDU session release for the PDU session. In addition, the UE may use an eMBB DRB to continue user plane traffic.

At 824, based on successful establishment of the DRB, user plane traffic for the first S-NSSAI may be routed through the DRB.

At 826, based on determining that a neighboring cell supports the first S-NSSAI, the UE may perform a local release to tear down (e.g., discontinue) an RRC connection with the second cell and reselect to the neighboring cell. Further, the UE may establish an RRC connection with the neighboring cell and then a new DRB for the PDU session. In addition, the UE may add information associated with the neighboring cell, e.g., such as PCI, band, frequency, location, supported network slice(s) (e.g., at least the first S-NSSAI) to the database.

At 828, based on determining that the first S-NSSAI has other USRP rules that allow routing traffic to another established DRB, the UE may route traffic for the PDU session to the default-DRB matching the USRP rule.

Figure 9:
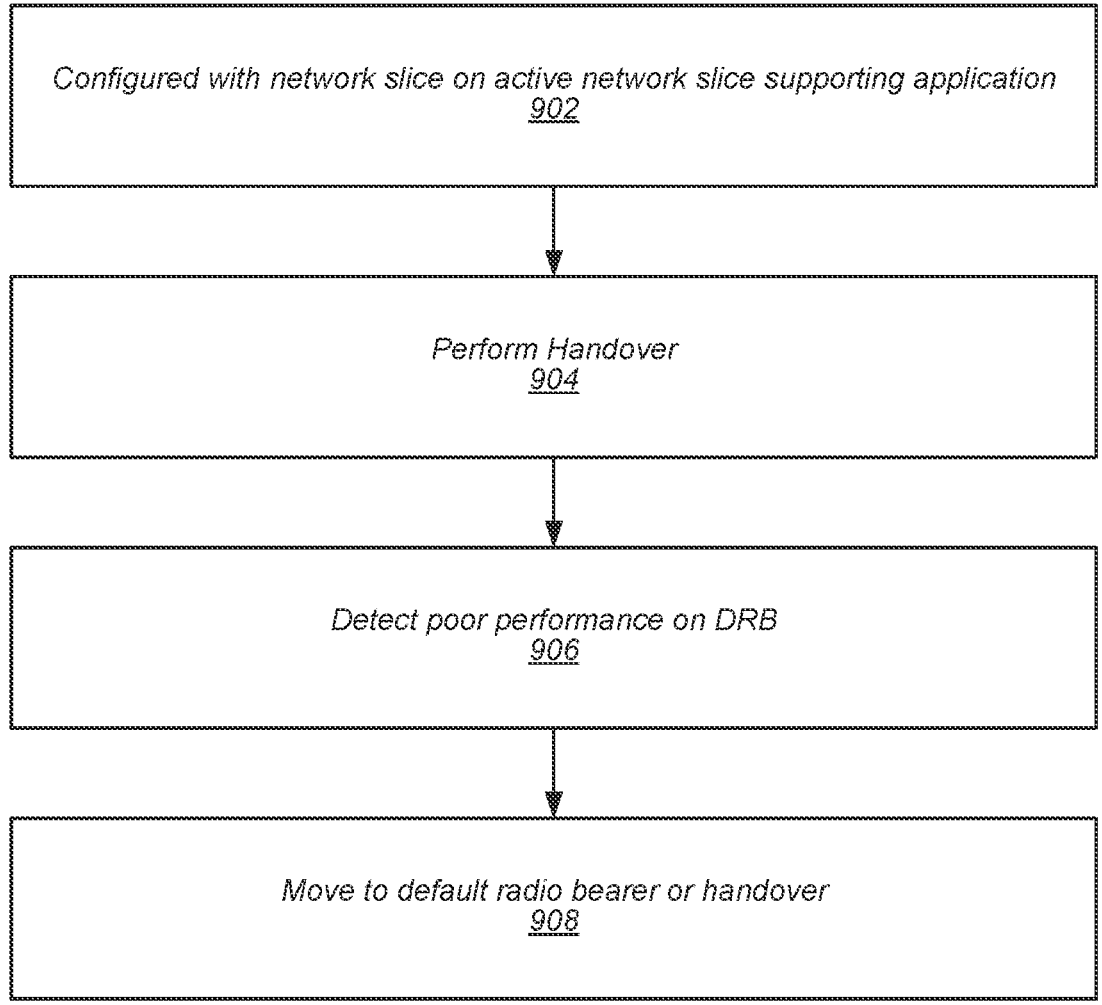
FIG. 9 illustrates a block diagram of an example of a method for network slice switching based on network slice performance, according to some embodiments.

As another example, FIG. 9 illustrates a block diagram of an example of a method for network slice switching based on network slice performance, according to some embodiments. The method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a UE, such as UE 106, may be configured with a network slice on an active network slice supporting application. Thus, the UE may have established an RRC connection with a first cell hosted and/or supported by a first base station, such as base station 102. Further, as part of registration on the first cell, the UE may receive an indication that the first cell supports network slicing and may initiate a protocol data unit (PDU) session towards a first Single-Network Slice Selection Assistance Information (S-NSSAI), where the first S-NSSAI is part of allowed NSSAIs on the first cell. Note that the S-NSSAI includes at least a slice/service type (SST) field and may include a service differentiator (SD) field. The SST field defines an expected behavior of the network slice in terms of specific features and services, such as vehicle-to-everything (V2X), enhanced mobile broadband (eMBB), ultra-reliable low latency communication (URLLC), massive Internet of Things (MIOT), and/or high-performance machine-type communications (HMTC).

At 904, the UE may receive handover instructions to a second cell and perform the handover to the second cell. The handover instructions to the second cell may be received via an RRC reconfiguration message. The second cell may be supported by another base station, such as another base station 102.

At 906, the UE may detect poor performance of the DRB. Note that when a network slice specific DRB is encountering poor performance, it may reflect as poor user-experience. Thus, in some instances, the UE may step through gated logic to detect poor performance of the DRB. For example, the UE may check if Real-Time Transport Protocol (RTP) packet loss is greater than a first threshold. Further, if the RTP packet loss is not greater than the first threshold, the UE may check if jitter buffer is greater than a second threshold. Additionally, if the RTP packet loss is not greater than the first threshold and the jitter buffer is not greater than the second threshold, the UE may check if latency is greater than a third threshold. As another example, the UE may use a network slice decision table, e.g., as illustrated in Table 1 to detect poor performance of the DRB. Note that the metrics shown in Table 1 are illustrative only, and other metrics may be used. Note further, that any of the conditions illustrated in Table 1 obtaining may be an indication of poor DRB performance. In addition, the metrics used to detect poor performance of the DRB may include higher layer based factors (e.g., metrics), such as Packet Delay Budget, RTP loss, Mean Opinion Score (MOS) score, video key performance indicators (KPIs), and so forth, layer 1 factors (metrics), such as block error rate (BLER) on a physical downlink shared channel (PDSCH) or a physical uplink shared channel (PUSCH), and/or layer 2 factors (metrics), such as Packet Data Convergence Protocol (PDCP) discards. Thus, as shown in Table 1, metrics to detect poor DRB performance may include packet delay budget, RTP packet loss, MoS Score, PDSCH/PUSCH BLER, and/or PDCP discards. Data for packet delay budget may be sourced from a 5G QoS Identifier (5QI) from an RRC layer of the UE and the packet delay budget may be compared to a first absolute threshold, e.g., Th_1. Data for RTP packet loss may be sourced from a baseband (BB) processor of the UE and RTP loss rate (e.g., lost sequence numbers/total number of sequence numbers transmitted) may be compared to a second threshold, Th_2, e.g., as a percentage. Data for MoS score may be sourced from an application processor (AP) and BB and a moving average of MoS drop may be compared to a third threshold. Data for PDSCH/PUSCH block error rate (BLER) may be sourced from BB and a moving average of PDSCH/PUSCH BLER may be compared to a fourth threshold. Data for PDCP discards may be sourced from BB and a moving average of PDCP BLER may be compared to a fifth threshold.

TABLE 1

Network Slice Decision Table

| Metric | Source | Output |
| --- | --- | --- |
| Packet Delay Budget | 5QI mapping from RRC | Packet Delay budget > Th_1 |
| RTP Packet Loss | RTP packet loss from BB | RTP loss rate > Th_2 |
| MoS Score | MoS from AP/BB | Moving average MoS drop > Th_3 |
| PDSCH/PUSCH BLER | BB | Moving average BLER > Th_4 |
| PDCP Discards | BB | Moving average BLER > Th_5 |

At 908, in response to any of the above conditions obtaining (e.g., the RTP packet loss is greater than the first threshold, the jitter buffer is greater than the second threshold, or the is greater than the third threshold and/or any of the conditions illustrated in Table 1), the UE may move network slice data to a default eMBB DRB (e.g., a default bearer) or attempt to handover to another cell.

Figure 10:
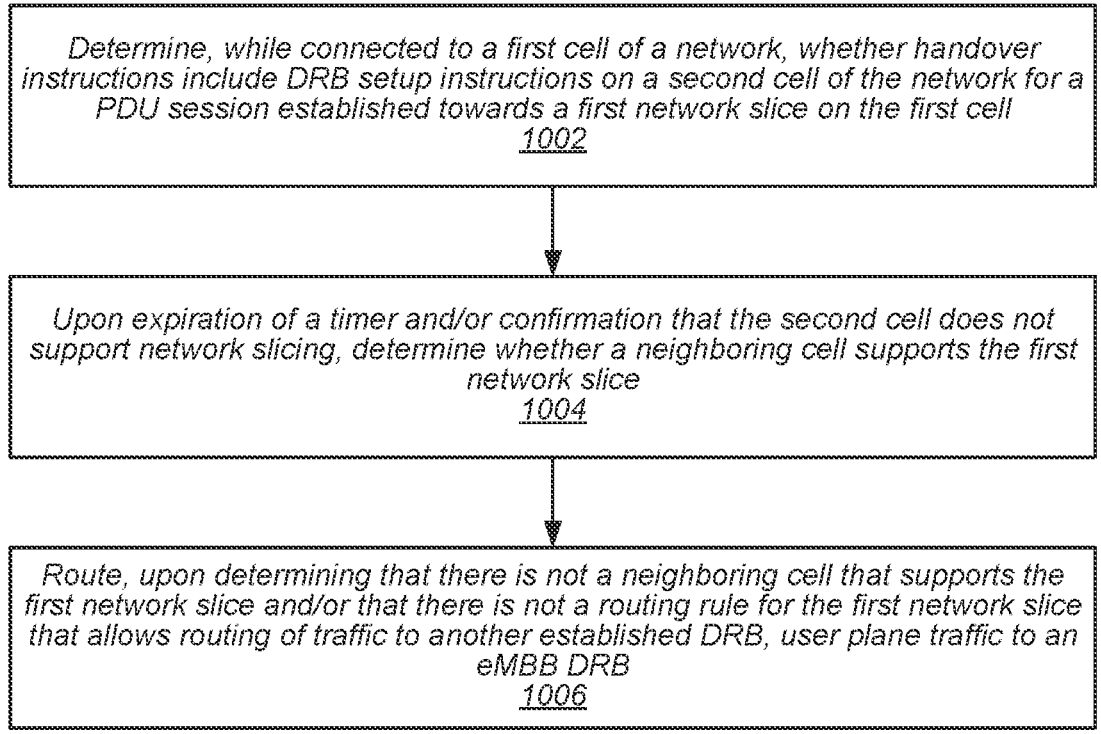
FIG. 10 illustrates a block diagram of an example of a method for network slice switching based on network support of network slicing, according to some embodiments.

FIG. 10 illustrates a block diagram of an example of a method for network slice switching based on network support of network slicing, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a UE, such as UE 106, may determine, while connected to a first cell of a network, whether handover instructions include data radio bearer (DRB) setup instructions on a second cell of the network for a protocol data unit (PDU) session established towards a first network slice on the first cell.

At 1004, the UE may, upon expiration of a timer and/or confirmation that the second cell does not support network slicing, determine whether a neighboring cell supports the first network slice. In some instances, the UE may initiate the timer in response to determining that the handover instructions do not include DRB setup instructions for the PDU session. In some instances, a duration of the timer may be based, at least in part, on a type of the first network slice. For example, a duration of the timer is shorter for guaranteed bitrate (GBR) network slices as compared to non-GBR network slices. Note that GBR network slice services may include services such as live video streaming and/or ultra-reliable low latency communication. Note further that non-GBR network slice services may include services such as voice over Internet Protocol (VOIP), video conferencing, and/or buffered video streaming.

At 1006, the UE may route, upon determining that there is not a neighboring cell that supports the first network slice and/or that there is not a routing rule (e.g., another user equipment (UE) Route Selection Policy (USRP) rule) for the first network slice that allows routing of traffic to another established DRB, user plane traffic to an enhanced mobile broadband (eMBB) DRB.

In some instances, the UE may determine, prior to expiration of the timer, whether the DRB for the PDU session towards the first network slice has been setup. Further, the UE may, in response to determining that the DRB for the PDU session towards the first network slice has been setup, route user plane traffic through the DRB. Additionally, the UE may, in response to determining that the DRB for the PDU session towards the first network slice has been setup, perform local release to tear down a radio resource control (RRC) connection with the second cell established upon handover to the second cell. In addition, the UE may perform a new RRC connection procedure to connect to the second cell and determine whether the DRB for the PDU session towards the first network slice has been setup. In response to determining that the DRB for the PDU session towards the first network slice has been setup, the UE may route user plane traffic through the DRB.

In some instances, the UE may, in response to determining that there is a neighboring cell that supports the first network slice, performing local release to tear down a radio resource control (RRC) connection with the second cell established upon handover to the second cell. Additionally, the UE may perform an RRC connection procedure to connect to the neighboring cell and add information associated with the neighboring cell to a database associated with network slicing. The information may include a primary cell identifier of the neighboring cell, a cell identifier of the neighboring cell, a cell frequency of the neighboring cell, a cell band of the neighboring cell, a cell tracking area of the neighboring cell, a cell location in longitude and latitude of the neighboring cell, network slices supported by the neighboring cell, and/or network slices not supported by the neighboring cell.

In some instances, the UE may, in response to determining that there is another USRP rule for the first network slice that allows routing of traffic to another established DRB, route the user plane traffic to a default DRB with a matching USRP rule.

In some instances, the UE may add information associated with the second cell to a database associated with network slicing. The information may include a primary cell identifier of the second cell, a cell identifier of the second cell, a cell frequency of the second cell, a cell band of the second cell, a cell tracking area of the second cell, a cell location in longitude and latitude of the second cell, network slices supported by the second cell, and/or network slices not supported by the second cell.

In some instances, the UE may, in response to determining that the handover instructions do include DRB setup instructions for the PDU session, establish the DRB for the PDU session. In addition, the UE may route user plane traffic through the DRB. Further, in some instances, the UE may monitor DRB performance via one or more metrics and, in response to determining that DRB performance is poor based on a comparison of the one or more metrics to one or more respective thresholds, perform one or more remedial actions. The one or more remedial actions may include one or more of moving user plane traffic to a default DRB until an end of the PDU session and/or initiating a handover to another cell. The one or more metrics may include one or more higher layer based metrics, layer one (L1) based metrics, and/or layer two (L2) based metrics. The higher layer based metrics may include one or more of a packet delay budget, a Real-Time Protocol (RTP) packet loss rate, a Mean Opinion Score (MoS) average drop, and/or one or more video key performance indicators (KPIs). The L1 based metrics may include one or more of physical downlink shared channel block error rate (BLER) and/or physical uplink shared channel BLER. The L2 based metrics may include Packet Data Convergence Protocol (PDCP) discards.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for network slice switching based on network support of network slicing, comprising:
   determining, while connected to a first cell of a network, whether handover instructions include data radio bearer (DRB) setup instructions on a second cell of the network for a protocol data unit (PDU) session established towards a first network slice on the first cell;
   upon expiration of a timer initiated in response to the determination and confirmation that the second cell does not support network slicing, determining whether a neighboring cell supports the first network slice; and
   routing, upon determining that there is not a neighboring cell that supports the first network slice and that there is a routing for the first network slice that allows routing of traffic to another established DRB, user plane traffic to an enhanced mobile broadband (eMBB) DRB.

2. The method of claim 1, further comprising:
   initiating, in response to determining that the handover instructions do not include DRB setup instructions for the PDU session, the timer.

3. The method of claim 1, further comprising:
   determining, prior to expiration of the timer, whether the DRB for the PDU session towards the first network slice has been setup; and
   in response to determining that the DRB for the PDU session towards the first network slice has been setup, routing user plane traffic through the DRB.

4. The method of claim 3, further comprising:
   in response to determining that the DRB for the PDU session towards the first network slice has been setup, performing local release to tear down a radio resource control (RRC) connection with the second cell established upon handover to the second cell;
   performing a new RRC connection procedure to connect to the second cell;
   determining whether the DRB for the PDU session towards the first network slice has been setup; and
   in response to determining that the DRB for the PDU session towards the first network slice has been setup, routing user plane traffic through the DRB.

5. The method of claim 1, further comprising:
   in response to determining that there is a neighboring cell that supports the first network slice, performing local release to tear down a radio resource control (RRC) connection with the second cell established upon handover to the second cell;
   performing an RRC connection procedure to connect to the neighboring cell; and
   setup a new DRB for the PDU session.

6. The method of claim 1, further comprising:
   in response to determining that there is another USRP rule for the first network slice that allows routing of traffic to another established DRB, routing the user plane traffic to a default DRB with a matching USRP rule.

7. The method of claim 1, further comprising:
   adding information associated with the second cell to a database associated with network slicing.

8. The method of claim 7,
   wherein the information includes one or more of:
   a primary cell identifier;
   a cell identifier;
   a cell frequency;
   a cell band;
   a cell tracking area;
   a cell location in longitude and latitude;
   network slices supported; or
   network slices not supported.

9. A user equipment device (UE), comprising:
   at least one antenna;
   at least one radio in communication with the antenna; and
   at least one processor in communication with the at least one radio and configured to cause the UE to:
     determine, while connected to a first cell of a network, whether handover instructions include data radio bearer (DRB) setup instructions on a second cell of the network for a protocol data unit (PDU) session established towards a first network slice on the first cell;
     upon expiration of a timer initiated in response to the determination and confirmation that the second cell does not support network slicing, determine whether a neighboring cell supports the first network slice; and
     route, upon determining that there is not a neighboring cell that supports the first network slice, user plane traffic to an enhanced mobile broadband (eMBB) DRB.

10. The UE of claim 9,
    wherein a duration of the timer is based, at least in part, on a type of the first network slice.

11. The UE of claim 10,
    wherein a duration of the timer is shorter for guaranteed bitrate (GBR) network slices as compared to non-GBR network slices.

12. The UE of claim 11,
    wherein GBR network slice services include one or more of:
    live video streaming; or
    ultra-reliable low latency communication; and
    wherein non-GBR network slice services include one or more of:
    voice over Internet Protocol;
    video conferencing; or
    buffered video streaming.

13. The UE of claim 9,
wherein the at least one processor is further configured to:
  in response to determining that the handover instructions do include DRB setup instructions for the PDU session, establish the DRB for the PDU session; and
  route user plane traffic through the DRB.

14. The UE of claim 13,
wherein the one or more processors are further configured to:
  monitor DRB performance via one or more metrics; and
  in response to determining that DRB performance is poor based on a comparison of the one or more metrics to one or more respective thresholds, perform one or more remedial actions.

15. The UE of claim 14,
wherein the one or more remedial actions include one or more of:
  moving user plane traffic to a default DRB until an end of the PDU session; or
  initiating a handover to another cell.

16. The UE of claim 14,
wherein the one or more metrics include one or more:
  higher layer based metrics;
  layer one (L1) based metrics; or
  layer two (L2) based metrics.

17. An apparatus, comprising:
a memory; and
at least one processor in communication with the memory and configured to:
  determine, while connected to a first cell of a network, whether handover instructions include data radio bearer (DRB) setup instructions on a second cell of the network for a protocol data unit (PDU) session established towards a first network slice on the first cell;
  upon expiration of a timer initiated in response to the determining and confirmation that the second cell does not support network slicing, determine whether a neighboring cell supports the first network slice; and
  route, upon determining that is not a routing rule for the first network slice that allows routing of traffic to another established DRB, user plane traffic to an enhanced mobile broadband (eMBB) DRB.

18. The apparatus of claim 17,
wherein the at least one processor is further configured to:
  in response to determining that the handover instructions do include DRB setup instructions for the PDU session, establish the DRB for the PDU session;
  route user plane traffic through the DRB; and
  monitor DRB performance via one or more metrics, wherein the one or more metrics include one or more:
    higher layer based metrics;
    layer one (L1) based metrics; or
    layer two (L2) based metrics.

19. The apparatus of claim 18,
wherein the at least one processor is further configured to:
  in response to determining that DRB performance is poor based on a comparison of the one or more metrics to one or more respective thresholds, perform one or more remedial actions, wherein the one or more remedial actions include one or more of:
    moving user plane traffic to a default DRB until an end of the PDU session; or
    initiating a handover to another cell.

20. The apparatus of claim 18,
wherein the higher layer based metrics include one or more of:
  a packet delay budget;
  a Real-Time Protocol (RTP) packet loss rate;
  a Mean Opinion Score (MoS) average drop;
  one or more video key performance indicators (KPIs);
wherein the L1 based metrics include one or more of:
  physical downlink shared channel block error rate (BLER); or
  physical uplink shared channel BLER; and
wherein the L2 based metrics include Packet Data Convergence Protocol discards.

* * * * *